United States Patent Office 3,460,681
Patented Aug. 12, 1969

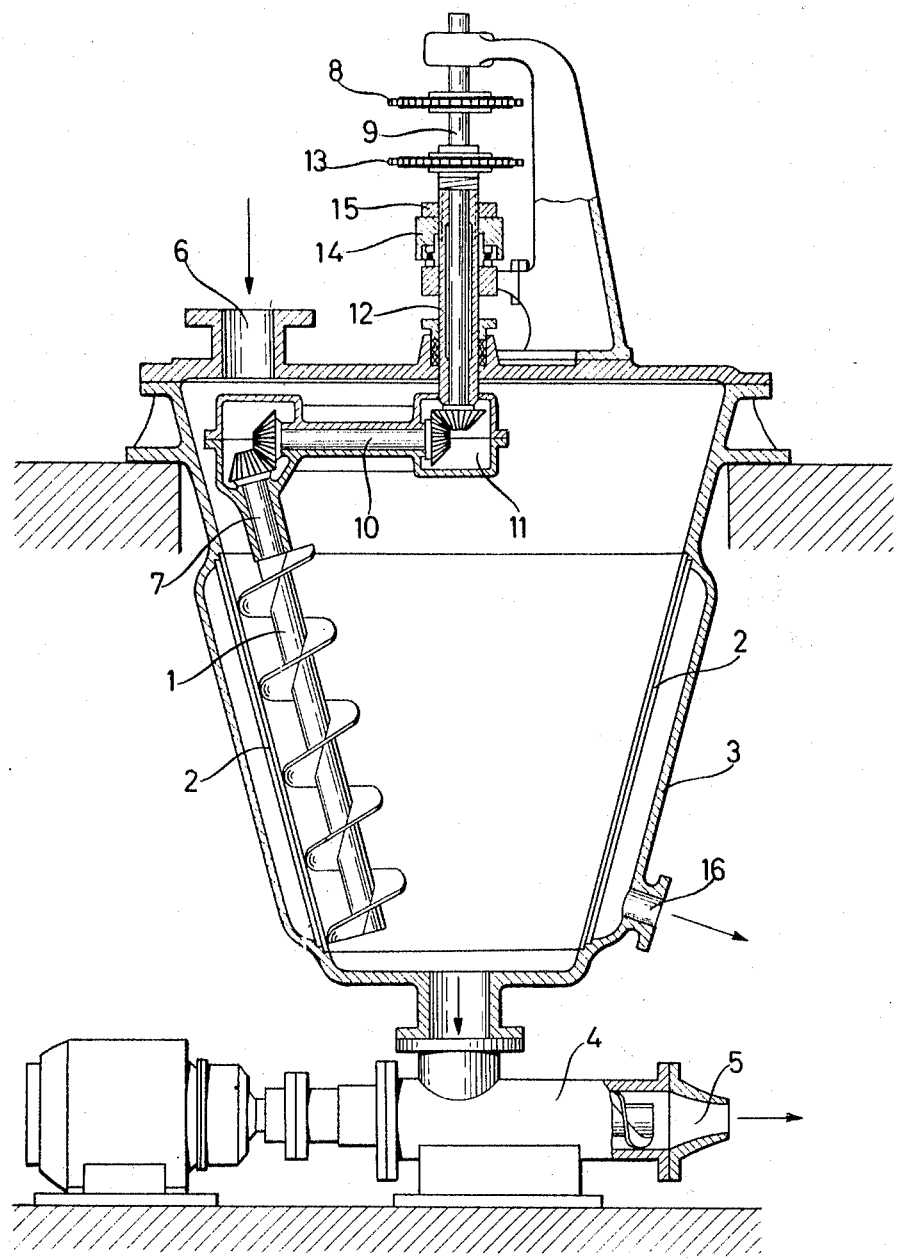

3,460,681
APPARATUS FOR MECHANICALLY AFTER-DEHUMIDIFYING AND FURTHER TREATING FILTER PRESS CAKES OF PIGMENT OR DISPERSION DYES
Karl-Hermann List and Gerhard Nöltner, Frankfurt am Main, Germany, assignors to Farbwerke Hoechst Aktiengesellschaft vormals Meister Lucius and Bruning, Frankfurt am Main, Germany, a corporation of Germany
Filed Feb. 1, 1966, Ser. No. 524,117
Claims priority, application Germany, Feb. 12, 1965, F 45,211
Int. Cl. B01d 33/36, 33/06
U.S. Cl. 210—415                3 Claims

ABSTRACT OF THE DISCLOSURE

An apparatus has been provided for mechanically after-drying filter press cakes or dispersion dyes which comprises a conical vessel, a feed means located on a top closure therefor, a discharge means located at the bottom closure therefor, a foraminous wall for said vessel defining an inner, conical space on the outside of said conical vessel, a space for removing a liquid through said foraminous wall, a filter means placed on said foraminous surface, a rotatable helical transport means, an axially driven means for driving said helical transport means around the periphery of said vessel and rotating the same, means for driving the transport means around the means rotating around the same and means for varying the rate of rotation of each of said helical transport means, and the means rotating said transport means around the periphery of said vessel.

---

The present invention relates to an apparatus for mechanically after-dehumidifying and further treating filter press cakes of pigment or dispersion dyes.

Filter press cakes are residues which are built up on the filter elements of a filtering apparatus in the dehumidification of solid-containing turbid liquids under pressure. As filtering apparatuses for dyestuff dispersions there are preferably used frame filter presses and occasionally also other apparatuses such as pressure suction filters, strainers and screws provided with a screen trough. Filter press cakes of pigment or dispersion dyes obtained with these known apparatuses at filter pressures of 1 to 5 atmospheres gage contain 15% to 30% of very fine dyestuff particles and, correspondingly, 70% to 85% of moisture. They have a pasty-stiff to solid consistency and complicated rheological properties.

By using higher pressures, the moisture content can still be reduced by a few percent until a limit is reached which is determined by the kind in which the moisture is bound. At these higher pressures, however, dyestuff penetrates through the filter and the filter is clogged, which interferes considerably with the working of the apparatus. For this reason one has hitherto generally rested satisfied with the solid content that could be obtained with the usual means under moderate pressure. That means, particularly if thermal drying processes cannot be used or are undesirable with a view to the quality of the product, that the further process is encumbered with ballast, the manufacture of moist product true to type is impeded and the filter cake cannot be used for preparations and fields of application which require a higher solid content. The latter applies also to dispersion dyes for dyeing synthetic fibers and the manufacture of flush pastes.

Now we have found that the above disadvantages can be avoided by subjecting filter press cakes of pigment or dispersion dyes which have been obtained in known manner to a process for a mechanical after-dehumidification and further treatment with comprises converting the stiff dyestuff mass to a pasty-liquid state with the help of a kneader, shifting the mass, while kneading continuously, on a filter layer about 0.5 to about 8 mm. thick which is built up of the same dyestuff mass, each unit area being stripped off about 8 to about 25 times per minute and filtered under pneumatic pressure, reducing the kneading, shifting and stripping-off motion to a value within the range of about one-fifth to about one-twentieth of the initial speed, continuing filtering until no more liquid flows off the mass which becomes stiffer and stiffer, repeating this sequence of process steps until no more liquid flows off the mass even immediately after the latter has been reconverted to a pasty-liquid state, and finally subjecting the mass to a further treatment.

By proceeding in this manner, solid contents of more than 40% are already obtained under pressures of less than 1 atmosphere gage. The filter layer is built up by spreading a part of the dyestuff mass on a perforated plate or a screening fabric. For this purpose, the kneader is passed over the perforated plate or screening fabric at a distance corresponding to a desired thickness of layer. If this distance is maintained throughout the process of the invention, the layer once applied is maintained; the remaining dyestuff mass is not, apparently, mixed with the filter layer. When the mass is kneaded at a high speed of the tool, which should be done for about 5 to 15 minutes, the solid particles which have an average diameter of the order of about $0.5 \times 10^{-3}$ mm. are orientated in a determined direction. The shifting of the mass on the filter layer has a similar effect. The bond of liquid is thereby loosened and a considerable quantity of liquid flows off already at low filtering pressures. The discharge of liquid gradually decreases. It increases again after the kneading, shifting and stripping-off motion has been reduced, and then finally ceases. The mass stiffens and may become crumbly in special cases at the lower speed of the tool. The repetition of the process steps is introduced by an increase of the speed of the tool, whereby the mass becomes again pasty-liquid.

The sequence of process steps may be repeated as often as desired. In general, the mass may already be subjected to a further treatment after one to two hours, calculated from the beginning of the dehumidification, the said further treatment being now carried out at a considerably smaller moisture ballast.

The further treatment may comprise, for example, kneading the mass with a liquid. By kneading with a wash liquid and subsequent dehumidifying in accordance with the invention, washing effects are obtained which render a time-consuming washing on filter presses which often lasts 10 to 12 hours partially or completely superfluous.

By kneading with other liquids, for example, those which are immiscible with, and capable of displacing, the residual liquid contained in the dyestuff mass, a rewetting may be produced. The rewetting agent is added in excess and the final moisture content is adjusted by repeating the after-dehumidification in accordance with the invention. This mode of proceeding has the essential advantage that it starts from a mass of low moisture content and therefore requires a smaller amount of rewetting agent.

The mass which has been after-dehumidified in accordance with the invention may also be subjected to a heat drying process in which considerable quantities of heat can be saved.

The process of the invention is advantageously carried out using an apparatus provided with means for metering in the filter press cakes and removing the dyestuff mass to be further treated, and comprising a roll with transporting means, which is mounted rotatably about its own axis like a planet and about a solar axis and disposed in a container which is symmetric with respect to the solar axis and the wall of which is permeable to moisture, the distance between the roll and the said wall being adjustable.

The apparatus constructed in accordance with the invention enables all process steps for after-dehumidification and further treatment, associated with the admixing of liquids by kneading or the passing through of gases, to be performed without recharging. The kneading, shifting and stripping-off of the mass requires a surprisingly low expenditure of energy.

The rotary motions of the roll about its own and the solar axes may be coupled by an exchangeable pair of wheels, one shaft of which is disposed coaxially with the solar axis while the other shaft is disposed coaxially with the roll. The coupling must leave free motion for readjusting the distance between the roll and the permeable wall. Instead of such coupling of the rotary motions about the planetary and the solar axes, separate drives may be provided in order to produce these motions. By designing the apparatus in this manner, the ratio of the number of revolutions of the roll about the solar axis to the number of revolutions of the roll about its own axis can be varied at will also when the apparatus is in operation. A range of adjustment of about 1:6 to about 1:20 is generally sufficient. The transporting means of the roll, for example, paddles, projections or grooves, are advantageously arranged such that they transport the mass towards the bottom.

A very simple solution for the construction of the roll and the adjustment of the thickness of layer is offered by a mode of construction of the apparatus of the invention in which the enclosed space of the axially symmetric container has the shape of a truncated cone and the planetary roll is a cylindrical screw.

The position of the solar axis to the axis of the roll may remain unchanged in this mode of construction for the thickness of layer is adjusted in this case by lifting or lowering the roll or the whole kneading mechanism. The spiral planetary roll produces particularly pronounced effects of kneading, shifting and stripping-off.

It is also advantageous to use as discharge means a single screw conveyor, the orifice of which is reduced with respect to the screw trough by baffle means such as, for example, nozzles, breaker plates or cones.

Such screws can only draw in and discharge the dyestuff mass if the pressure built up in the threads before the orifice is greater than the resistance of the orifice. The obtainable pressure depends, however, substantially on the moisture content of the mass. By an appropriate choice or adjustment of the baffle elements, a discharge of a mass which has been insufficiently after-dehumidified can therefore easily be prevented. Such discharge means therefore constitutes a safety device against premature discharge. It also offers the possibility to confer upon the discharged mass a shape that is appropriate for the further treatment, for example, the shape of strands or granules.

An apparatus suitable for use in carrying out the process of the invention is illustrated diagrammatically by way of example in the accompanying drawing which is a sectional elevation.

Referring to the drawing:

Roll 1 is a cylindrical screw which is mounted rotatably about its own axis and the axis of tapered container 3 provided with a wall 2 permeable to moisture. The distance of roll 1 from wall 2 can be adjusted by lifting or lowering the drive mechanism. As discharge means 4, a screw conveyor is arranged, the orifice of which is reduced with respect to the screw trough by nozzle 5. The feed means is not shown in the drawing. It may be a shaking tube or another known means suitable for transporting and metering in filter press cakes. Short feed pipe 6 may also be used for introducing a compressed gas. Short pipe 16 serves for removing the filtrate through a suction pipe.

Roll 1 is driven by chain wheel 8, vertical shaft 9 and horizontal shaft 10. The said shafts rest in bearings in casing 11. Of said casing 11, hollow shaft 12 is provided with a driving wheel 13 while neck 7 is mounted with roll 1. Driving wheels 8 and 13 are each connected in known manner by chains with driving motors not shown in the drawing. Screw nut 14 and check nut 15 serve for the altitude adjustment of casing 11 and therefore for the adjustment of the distance of roll 1 from wall 2.

When the apparatus is put into operation, the distance of roll 1 from wall 2 is adjusted to a value within the range of about 0.5 to about 8 mm. The filter press cake is then introduced through short feed pipe 6. The driving motors for the chain wheels are adjusted to the desired numbers of revolutions during the introduction of the filter press cake.

The filter layer is already built up during the first revolutions of the roll. The remaining mass, which corresponds to about four-fifths of the capacity of the container, is continuously kneaded, circulated and shifted on the filter layer by the rotation of the roll. For discharging the filtrate, short pipe 16 is advantageously connected to a water-ring air pump not shown in the drawing. The diminished pressure produced by such pumps is generally sufficient for producing and maintaining the necessary differential filter pressure. To produce higher differential pressures, short feed pipe 6 is connected to a compressed air or compressed gas conduit not shown after the introduction of the filter cake has been terminated. It is also possible to provide container 3 with another short pipe for this purpose.

When the quantity of filtrate flowing off decreases strongly, the speed of the roll is reduced by readjusting the driving motors. In the same manner, the speed of the roll is increased to introduce a new sequence of process steps. When the mass is sufficiently dehumidified, the container can be emptied through the discharge means.

When it is intended to mix the mass with a liquid by kneading, the mass remains in the container and is only drawn off after the excess of liquid thus produced has been removed.

The following examples serve to illustrate the invention but they are not intended to limit it thereto.

EXAMPLE 1

An azo dyestuff marketed under the name of "Permanent Yellow" which had been treated on a frame filter press still contained 70% of moisture. It was intended to obtain a solid content of at least 40%.

On the permeable wall composed of a supporting frame and a filter fabric of a mesh width of $30 \times 10^{-3}$ mm. of an apparatus of the above type having a capacity of 45 liters, a filter layer 3 mm. thick was built up using a screw. The apparatus was charged with a total of 38 liters of mass. The driving motors were adjusted to a number of revolutions of the roll about its own axis of 160 per minute and a number of revolutions about the solar axis of 16 per minute. At the discharge opening for the filtrate, a reduced pressure of 700 mm. of mercury was applied with the help of a water-ring air pump.

After the dystuff mass had been worked through on the filter layer for 10 minutes by continuously kneading, shifting and stripping-off with the screw, the number of revolutions of the screw about its own axis was reduced to 52 per minute and the number of revolutions about the solar axis to 5.2 per minute, and filtering was continued for 16 minutes at these numbers of revolutions. After these process steps had been repeated five times, the filter layer began to separate from the wall. The mass turned crumbly. After a total time of stay in the apparatus of 130 minutes, the mass had a solid content of 42%.

EXAMPLE 2

An azo dyestuff marketed under the name of "Hansa Yellow" having a moisture content of 69% was treated as described in Example 1. After a time of stay of 115 minutes, a solid content of 40% was obtained.

EXAMPLE 3

An azo dystuff marketed under the name of "Permanent Red" contained 31% of dry substance. By treating it for 130 minutes as described in Example 1, a dystuff mass having a solid content of 45% was obtained.

The mass was then kneaded with wash water until a moisture content of 75% was obtained and then again dehumidified as described in Example 1. After about 150 minutes a solid content of 45% had been reached again.

What is claimed is:

1. An apparatus for mechanically after-drying filter press cakes or dispersion dyes which comprises a vertically disposed conical vessel having top and bottom closures, a feed means located on the top closure therefor, a discharge means located at the bottom closure therefor, a foraminous wall for said vessel defining an inner, conical surface in the interior of said conical vessel, a space in the wall of the conical vessel for removing through an opening a liquid through said foraminous wall at reduced pressure from that inside the conical vessel, a filter means on said foraminous surface, a rotatable helical transport means in the form of a helix screw, a first axially driven means interconnected to the helix screw to rotate the same around its axis and adjacent the filter means thereby transporting the cake towards the discharge means, a second axially driven means concentric with said first means and interconnected to said screw to drive the same around the periphery of said vessel, separate drive means interconnected with said first and said second driven means to drive the same at different speeds, and adjusting means associated with said driven means to vary the distance between the helix screw and the foraminous wall.

2. The apparatus according to claim 1, wherein the conical vessel defines a truncated cone with the top and bottom being parallel and perpendicular to the longitudinal axis of the vessel, the transport means is a cylindrical helix screw.

3. An apparatus according to claim 1, wherein the discharge means is a single screw conveyor having restricted orifice means through which said dyes are discharged.

References Cited

UNITED STATES PATENTS

| | | | |
|---|---|---|---|
| 1,993,214 | 3/1935 | Hass | 210—415 X |
| 3,199,441 | 8/1965 | Haug | 210—415 X |
| 3,230,865 | 1/1966 | Hibbel et al. | 210—415 X |
| 3,272,481 | 9/1966 | Nauta | 259—111 |

SAMIH N. ZAHARMA, Primary Examiner